April 19, 1966     O. HERMANN     3,246,549
CHUCKING DEVICE
Filed Sept. 11, 1964     2 Sheets-Sheet 1
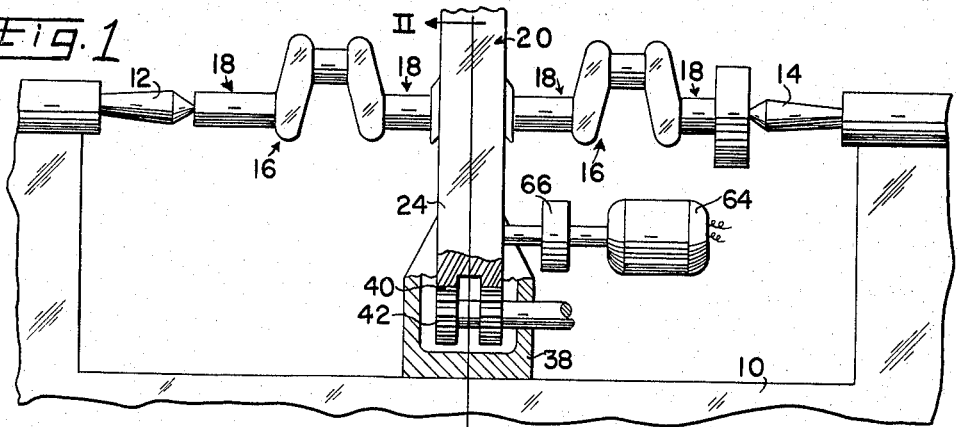
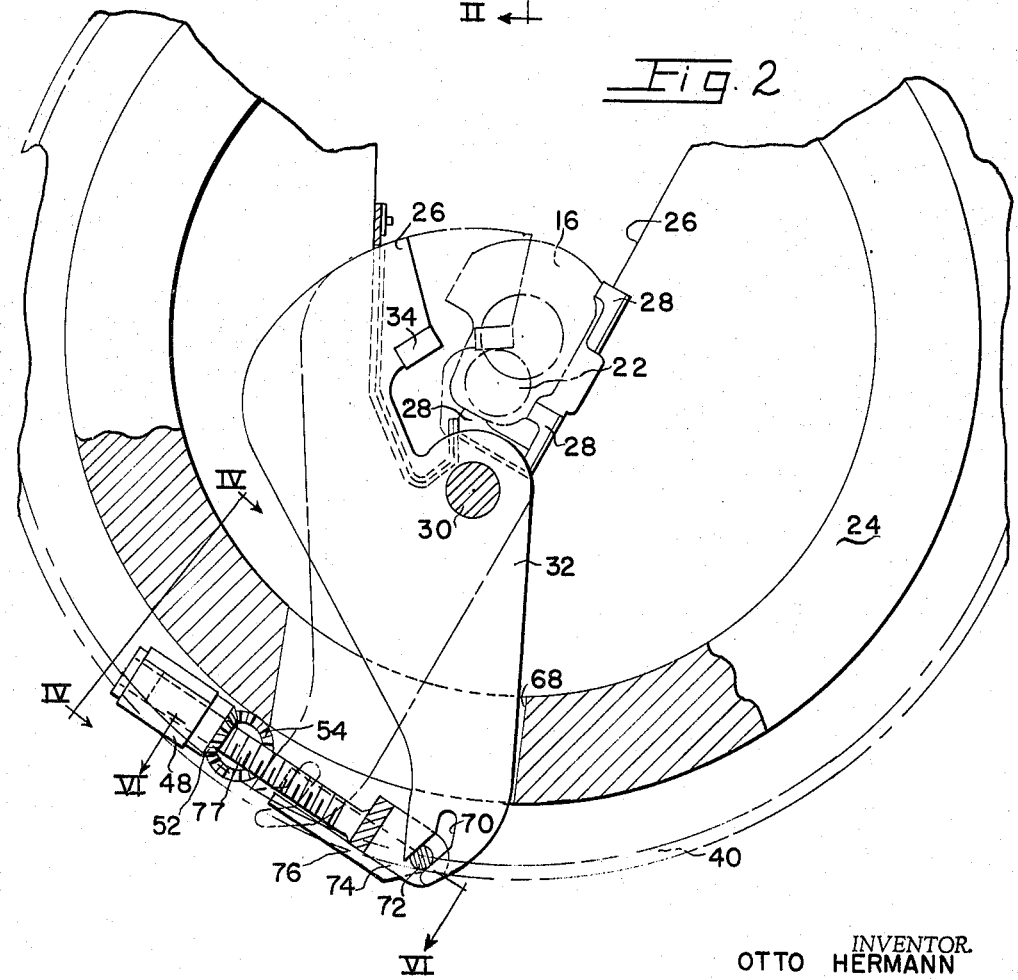
INVENTOR.
OTTO HERMANN
BY *Toulmin & Toulmin*
ATTORNEYS April 19, 1966     O. HERMANN     3,246,549

CHUCKING DEVICE

Filed Sept. 11, 1964     2 Sheets-Sheet 2

INVENTOR.
OTTO HERMANN
BY Toulmin & Toulmin
ATTORNEYS

United States Patent Office 3,246,549
Patented Apr. 19, 1966

3,246,549
CHUCKING DEVICE
Otto Hermann, Cincinnati, Ohio, assignor to The R. K. Le Blond Machine Tool Co., Cincinnati, Ohio, a corporation of Delaware
Filed Sept. 11, 1964, Ser. No. 395,849
8 Claims. (Cl. 82—40)

This invention relates to lathe chucks and is particularly concerned with a center drive chuck of the type employed for chucking crankshafts during the turning of the bearing regions of the crankshaft, particularly, the line bearing regions thereof.

Center drive chucks of the nature referred to are known and are widely used in crankshaft lathes and comprise rotary body members having a center opening through which the crankshaft to be machined extends and in which opening are anvils for supporting the crankshaft while a clamp jaw moves in the opening to clamp the crankshaft against the anvils. The body member of the chuck is rotatably supported on bearings and is driven adjacent the periphery thereof, as by gearing meshing with teeth formed on the periphery of the body portion.

In my prior application Ser. No. 358,250 filed Apr. 8, 1964 and entitled: "Chuck Device and Method of Actuating," there is disclosed a chuck arrangement of the same general nature as that disclosed in the present case, and wherein means are provided for opening and closing the chuck jaw without requiring precise indexing of the chuck body, which is a time-consuming operation amounting to a substantial percentage of a work cycle of the lathe.

The present invention is concerned in particular with an improvement in a center drive chuck of the general nature disclosed in the prior application referred to above.

An object of the present invention is the provision of a center drive chuck which is compact in the axial direction whereby no difficulties are presented with respect to exposing the bearing portions that are to be turned.

Another object of the present invention is the provision of a simplified center drive chuck structure which is nevertheless adequate for all chucking loads imposed thereon.

Still another object of the present invention is the provision of a center drive chuck in which the deformation of the chuck body due to the clamping forces exerted by the chuck on a crankshaft therein are maintained at a minimum by confining the chucking stresses to a limited region of the chuck body near the center thereof.

Still another object of this invention is the provision of improved and simplified actuating means for actuating the chuck in opening and closing operations for respectively releasing and gripping a crankshaft, and which mechanism can be operated without the chuck being indexed to a precise angular position.

These and other objects and advantages of this invention will become more apparent upon reference to the following specification taken in connection with the accompanying drawings, in which:

FIGURE 1 is a schematic view illustrating a fragment of a crankshaft lathe and showing the arrangement in the lathe of a center drive chuck of the type with which the present invention is concerned;

FIGURE 2 is a fragmentary sectional view indicated by line 2—2 on FIGURE 1 showing the chuck from the side and partly broken away to show some of the operating components thereof;

Figure 3:
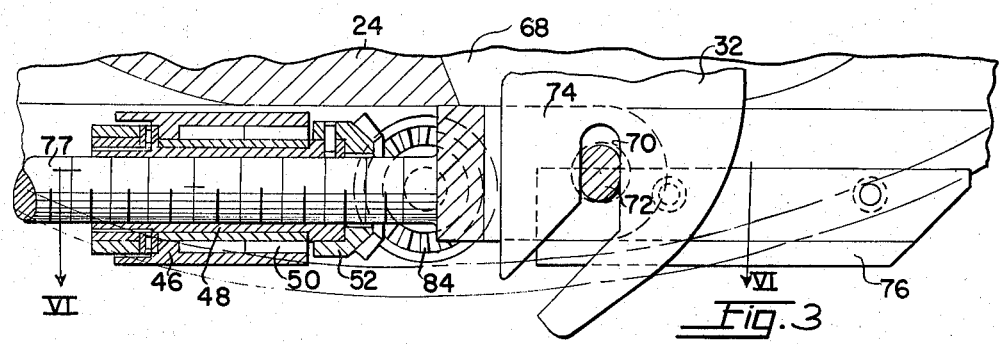
FIGURE 3 is a sectional view showing the portion of the actuating mechanism in the chuck body that is directly connected with the movable chuck jaw drawn at somewhat enlarged scale over the scale of FIGURE 2.

Referring to the drawings somewhat more in detail, the lathe shown in FIGURE 1 includes a bed 10 and the centers 12 and 14 which engage the centered ends of the crankshaft 16 that is to be machined. The portions of the crankshaft to be machined are indicated by arrows 18 which could also represent the cutting tools and it will be noted that the portions of the crankshaft to be cut are the portions that are concentric with the axis of rotation of the crankshaft.

It is desired for all of the journal portions of the crankshaft concentric with the axis of rotation of the crankshaft to be exposed, and to this end one or more chucks 20 are provided mounted on the bed and through which the crankshaft extends. More specifically, a pin bearing journal portion 22 is disposed within chuck 20, and it is this portion of the crankshaft that is gripped together with the crankshaft webs on opposite sides of that particular pin portion. By this arrangement all of the line bearing journal portions to be machined are exposed while the crankshaft is gripped with sufficient solidity to permit the exertion thereon of sufficient torque to carry out the desired machining operations.

The structure of the chuck is more completely shown in FIGURES 2 through 6 and wherein it will be seen that the chuck comprises a body portion 24 which may be composed of plates connected together or which may be otherwise fabricated. Chuck body 24 has a central opening 26 that receives crankshaft 16. Mounted in opening 26 are anvil elements 28 which have flat machined surfaces adapted for engaging machined flats on the web portions disposed on opposite sides of the pin journal portion 22 of the crankshaft that is in the chuck.

Pivotally mounted in the chuck body by pivot means 30 is a clamp arm 32 having a hardened portion 34 adapted for engaging pin 22 on the side thereof opposite the anvil portions. It will be observed that hardened portion 34 is somewhat inclined to a radial line passing therefrom through the center of pin 30 so that a wedging action is had on crank pin 22. This wedging action not only effects tight gripping of the crankshaft but also causes the chuck to compensate automatically for variations in the size of the crank pin.

It will further be noted that the point of engagement of hardened portion 34 of the chuck jaw is generally directly opposite pivot pin 30 with respect to the center of crank pin 22 and therefore the chucking stresses in the crankshaft are confined within a small region in the center of the chuck body whereby deforming of the chuck is substantially eliminated.

Figures 4, 5:
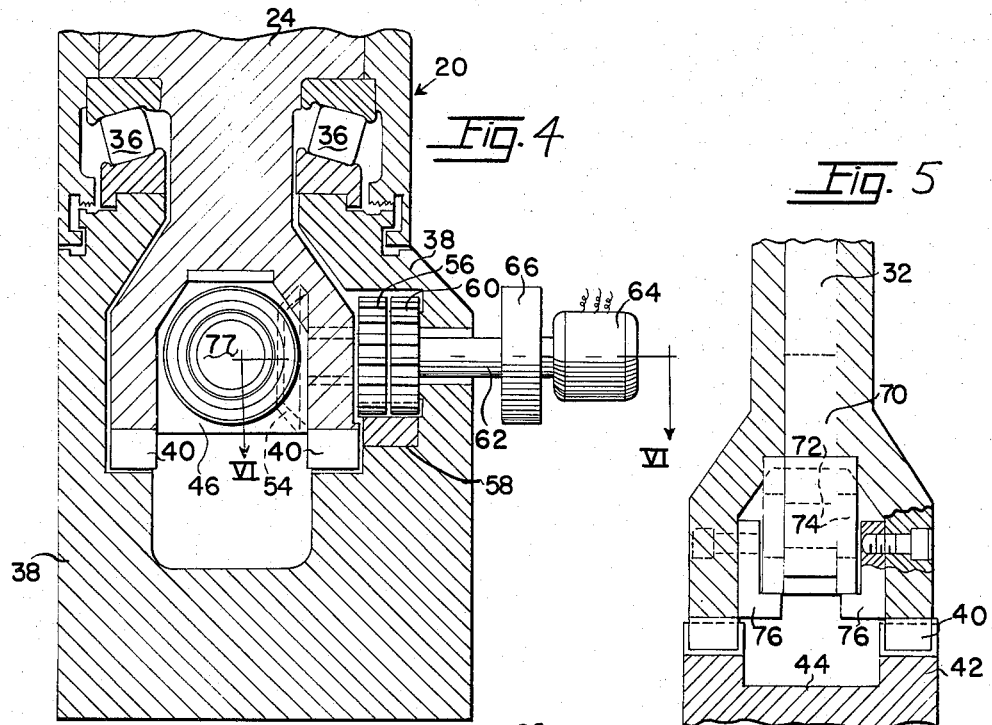
FIGURE 4 is a sectional view indicated by line 4—4 on FIGURE 2 showing the drive means for effecting the opening and closing of the chucks.
FIGURE 5 is a fragmentary sectional view through the rotatable portion of the chuck body at one side of the chuck body showing how the drive gear for the chuck body drivingly engages the teeth on the periphery thereof.

The body 24 of the chuck, as will be seen in FIGURE 4, is mounted on anti-friction tapered roller bearings 36 which are carried by frame 38 that is fixedly mounted in the lathe. In this manner the chuck body is rotatably supported for rotation on an axis that will coincide with the axis of the bearing portions of the crankshaft to be machined. As will be seen in FIGURES 2, 4 and 5, the periphery of the chuck body is provided with gear teeth 40 and these gear teeth mesh with the teeth of a drive pinion indicated at 42 in FIGURE 5. This pinion has a relieved center portion 44 to accommodate the chuck actuating mechanism which projects outwardly beyond teeth 40 of the chuck body.

With respect to the actuating mechanism, it will be noted that the peripheral portion of the chuck body is bifurcated, and located between the legs of the peripheral portion of the chuck body is a block 46 in which is rotatably supported a nut 48 as by the needle bearings 50. Nut 48 at one end has fixed thereto a bevel gear 52 meshing with another bevel gear 54 mounted on a shaft together with a pinion 56. The said shaft is rotatably journalled in one of the leg portions of the periphery of the chuck body.

As will be seen in FIGURE 4, gear or pinion 56 is continuously in mesh with an internal ring gear 58 which is carried in support frame 38 coaxially with chuck body 24. Ring gear 58 also meshes with another pinion or gear 60 carried by shaft 62 that is journalled in the support frame 38 of the chuck. Shaft 62 is adapted for selective connection with a drive motor 64 by way of an electric clutch or the like 66. It will be apparent that whenever clutch 66 is open, the chuck body can rotate in support frame 38 and ring gear 58 will be carried along with the chuck body and gear 60 will rotate idly together with shaft 62. At any time the chuck body is stopped, however, and in whatever position it is stopped, clutch 66 can be closed and motor 64 is energized and gear 60 will then drive ring gear 58 which, in turn, will drive through gear or pinion 56 and bevel gears 54 and 52 into nut 48.

It will be appreciated that no precise indexing of the chuck is required to permit opening and closing thereof. As a matter of practicality the chuck is indexed to approximately the same position for each chucking and unchucking operation so that the crankshaft therein is presented in approximately properly oriented position to a loading and unloading device thus permitting automatic handling of the crankshaft. The time consuming inching of the chuck into exactly indexed position to permit insertion of a chuck operating wrench or the like however is eliminated and a much faster overall work cycle can therefore be maintained.

Returning to the chuck jaw 32, this member includes a portion extending radially outwardly through an opening 68 in the chuck body and terminates in a slotted end portion 70. The slot in end portion 70 receives a pin 72 carried by a slide 74 that is guided for tangential movement adjacent the periphery of the chuck body by the guide members 76 carried between the two legs of the chuck body in the periphery thereof. Slide 74 includes a threaded shank portion 77 which extends threadedly through nut 48 so that rotation of nut 48 will drive shank portion 77 and slide 74 axially and, through the cooperation of pin 72 and the slot in the end of the chuck jaw, move the chuck jaw in its opening and closing directions.

As will be seen in the drawings, pin 72 is preferably somewhat flatted on its opposite sides which engage the side walls of the slot, and this will materially reduce the stress at this point and improve the wearing qualities of the pin and slot walls. It will further be noted that the slot is angularly formed so that the pin and slot are disposed relative to each other to the best advantage when the chuck is in closed position, whereas as the chuck jaw opens, the angularity of the lower portion of the slot permits increased movement of the chuck jaw over what would occur if the slot were straight.

The aforementioned block 46 is, of course, fixed between the legs of the bifurcated peripheral portion of the chuck body so that the force exerted on the chuck jaw is transmitted to the body. Once the chuck jaw is closed, however, the principal forces are exerted in the region of pivot pin 30 and there is no tendency to deform the chuck body. In any case, a substantial mechanical advantage exists that prevents any great stress from being exerted on the chuck body by the forces exerted on the outer end of the movable chuck jaw by the aforementioned nut and screw.

Figures 6, 7:
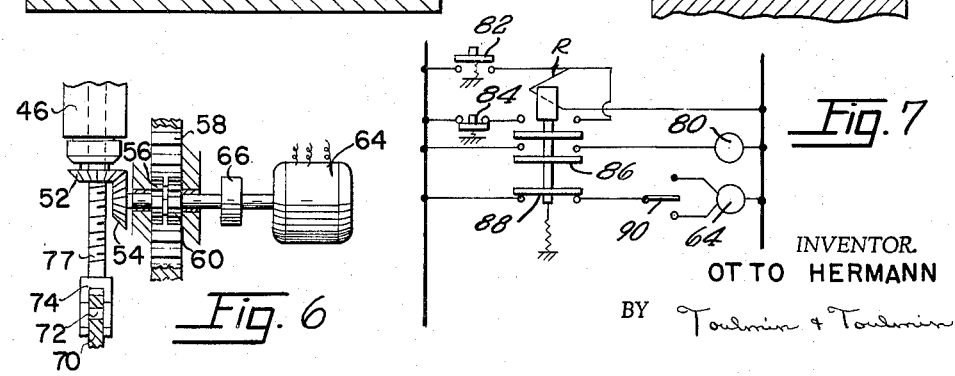
FIGURE 6 is a plan sectional view indicated by line 6—6 on FIGURES 2, 3 and 4 showing more completely the drive train from the chuck jaw actuating motor to the chuck jaw.
FIGURE 7 is a schematic showing of an electric control circuit.

In FIGURE 7 a simplified electric circuit is illustrated wherein 80 represents a drive motor for driving pinion 42. The energization of this motor is under the control of a relay R which can be energized by depressing a start switch 82, and which can be de-energized by depressing a stop switch 84. When the relay is energized motor 80 is energized by way of a blade 86 of the relay, while a blade 88 thereof interrupts the energizing circuit to motor 64. When relay R is de-energized blade 88 closes and this will complete an energizing circuit to motor 64 through selector switch 90, which can be moved from a center open position into either of two closed positions for reversible energization of motor 64 for opening or closing the chuck.

Motor 80, it will be understood, is the main drive motor for the blade structure because it drives the chuck in rotation in which the workpiece is secured.

It will be understood that this invention is susceptible to modification in order to adapt it to different usages and conditions; and accordingly, it is desired to comprehend such modifications within this invention as may fall within the scope of the appended claims.

What is claimed is:

1. In a center drive chuck; a support frame, a chuck body rotatable in said frame and having a central opening to receive a workpiece, anvil means in the body to engage the workpiece on one side, a two arm jaw member pivoted in the chuck body having a wedge element on the end of the one arm to engage the workpiece on the side opposite said anvil means to clamp the workpiece in said chuck, the other arm on the jaw member extending to the region of the periphery of the chuck body, a slide member reciprocable on the chuck body at the periphery thereof in a generally tangential direction and connected to said other arm, a threaded shank on the slide, a nut on the chuck body receiving said shank, gearing drivingly connected to said nut including a first pinion adjacent the periphery of the chuck body at the side thereof on an axis parallel to the axis of rotation of the chuck body, a ring gear coaxial with the chuck body rotatably carried by said support frame and meshing with said first pinion, a second pinion rotatably carried by said support frame and also meshing with said ring gear, a reversible motor, and clutch means for selectively engaging said motor with said second pinion to actuate said clutch jaw or for disengaging said motor from said second pinion to permit the second pinion to rotate freely during rotation of the chuck body.

2. In a center drive chuck; a support frame, a chuck body rotatable in said frame and having a central opening to receive a workpiece, anvil means in the body to engage the workpiece on one side, a two arm jaw member pivoted in the chuck body having a wedge element on the end of the one arm to engage the workpiece on the side opposite said anvil means to clamp the workpiece in said chuck, the other arm on the jaw member extending to the region of the periphery of the chuck body, a slide member reciprocable on the chuck body at the periphery thereof in a generally tangential direction and connected to said other arm, a threaded shank on the slide, a nut on the chuck body receiving said shank, gearing drivingly connected to said nut including a first pinion adjacent the periphery of the chuck body at the side thereof on an axis parallel to the axis of rotation of the chuck body, a ring gear coaxial with the chuck body rotatably carried by said support frame and meshing with said first pinion, a second pinion rotatably carried by said support frame and also meshing with said ring gear, a reversible motor, and clutch means for selectively engaging said motor with said second pinion to actuate said clutch jaw or for disengaging said motor from said second pinion to permit the second pinion to rotate freely during rotation of the chuck body, the pivotal connection of said jaw member to the chuck body being adjacent said anvil means to confine clamping stresses in the chuck body to the region of the center thereof and said other arm being substantially longer than said one arm whereby a small force on said other arm will develop a high clamping force on said one arm.

3. In a center drive chuck; a support frame, a chuck body rotatable in said frame and having a central opening to receive a workpiece, anvil means in the body to engage the workpiece on one side, a two arm jaw member pivoted in the chuck body having a wedge element on the end of the one arm to engage the workpiece on the side opposite said anvil means to clamp the workpiece in said chuck, the other arm on the jaw member extending to the region of the periphery of the chuck body, a slide member reciprocable on the chuck body at the periphery thereof in a generally tangential direction and connected to said other arm, a threaded shank on the slide, a nut on the chuck body receiving said shank, gearing drivingly connected to said nut including a first pinion adjacent the periphery of the chuck body at the side thereof on an axis parallel to the axis of rotation of the chuck body, a ring gear coaxial with the chuck body rotatably carried by said support frame and meshing with said first pinion, a second pinion rotatably carried by said support frame and also meshing with said ring gear, a reversible motor, and clutch means for selectively engaging said motor with said second pinion to actuate said clutch jaw or for disengaging said motor from said second pinion to permit the second pinion to rotate freely during rotation of the chuck body, the pivotal connection of said jaw member to the chuck body being adjacent said anvil means to confine clamping stresses in the chuck body to the region of the center thereof and said other arm being substantially longer than said one arm whereby a small force on said other arm will develop a high clamping force on said one arm, said slide having a pin therein, and the outer end of said other arm having a slot receiving said pin.

4. In a center drive chuck; a support frame, a chuck body rotatable in said frame and having a central opening to receive a workpiece, anvil means in the body to engage the workpiece on one side, a two arm jaw member pivoted in the chuck body having a wedge element on the end of the one arm to engage the workpiece on the side opposite said anvil means to clamp the workpiece in said chuck, the other arm on the jaw member extending to the region of the periphery of the chuck body, a slide member reciprocable on the chuck body at the periphery thereof in a generally tangential direction and connected to said other arm, a threaded shank on the slide, a nut on the chuck body receiving said shank, gearing drivingly connected to said nut including a first pinion adjacent the periphery of the chuck body at the side thereof on an axis parallel to the axis of rotation of the chuck body, a ring gear coaxial with the chuck body rotatably carried by said support frame and meshing with said first pinion, a second pinion rotatably carried by said support frame and also meshing with said ring gear, a reversible motor, and clutch means for selectively engaging said motor with said second pinion to actuate said clutch jaw or for disengaging said motor from said second pinion to permit the second pinion to rotate freely during rotation of the chuck body, the pivotal connection of said jaw member to the chuck body being adjacent said anvil means to confine clamping stresses in the chuck body to the region of the center thereof and said other arm being substantially longer than said one arm whereby a small force on said other arm will develop a high clamping force on said one arm, said slide having a pin therein, and the outer end of said other arm having a slot receiving said pin, said slot including a radial portion in which the pin is located when the jaw is closed and an angular portion in which the pin is located when the jaw is open.

5. In a center drive chuck; a support frame, a chuck body rotatable in said frame and having a central opening to receive a workpiece, anvil means in the body to engage the workpiece on one side, a two arm jaw member pivoted in the chuck body having a wedge element on the end of the one arm to engage the workpiece on the side opposite said anvil means to clamp the workpiece in said chuck, the other arm on the jaw member extending to the region of the periphery of the chuck body, a slide member reciprocable on the chuck body at the periphery thereof in a generally tangential direction and connected to said other arm, a threaded shank on the slide, a nut on the chuck body receiving said shank, gearing drivingly connected to said nut including a first pinion adjacent the periphery of the chuck body at the side thereof on an axis parallel to the axis of rotation of the chuck body, a ring gear coaxial with the chuck body rotatably carried by said support frame and meshing with said first pinion, a second pinion rotatably carried by said support frame and also meshing with said ring gear, a reversible motor, clutch means for selectively engaging said motor with said second pinion to actuate said clutch jaw or for disengaging said motor from said second pinion to permit the second pinion to rotate freely during rotation of the chuck body, the pivotal connection of said jaw member to the chuck body being adjacent said anvil means to confine clamping stresses in the chuck body to the region of the center thereof and said other arm being substantially longer than said one arm whereby a small force on said other arm will develop a high clamping force on said one arm, said slide having a pin therein, and the outer end of said other arm having a slot receiving said pin, said slot including a radial portion in which the pin is located when the jaw is closed and an angular portion in which the pin is located when the jaw is open, said pin being flatted on the sides which engage the sides of the said slot to inhibit wear of the pin and slot.

6. In a center drive chuck; a support frame, a chuck body rotatable in said frame and having a central opening to receive a workpiece, anvil means in the body to engage the workpiece on one side, a two arm jaw member pivoted in the chuck body having a wedge element on the end of the one arm to engage the workpiece on the side side opposite said anvil means to clamp the workpiece in said chuck, the other arm on the jaw member extending to the region of the periphery of the chuck body, a slide member reciprocable on the chuck body at the periphery thereof in a generally tangential direction and connected to said other arm, a threaded shank on the slide, a nut on the chuck body receiving said shank, gearing drivingly connected to said nut including a first pinion adjacent the periphery of the chuck body at the side thereon on an axis parallel to the axis of rotation of the chuck body, a ring gear coaxial with the chuck body rotatably carried by said support frame and meshing with said first pinion, a second pinion rotatably carried by said support frame and also meshing with said ring gear, a reversible motor, clutch means for selectively engaging said motor with said second pinion to actuate said clutch jaw or for disengaging said motor from said second pinion to permit the second pinion to rotate freely during rotation of the chuck body, said chuck body having its peripheral portion formed of two axially spaced legs, said other arm extending between said legs, said nut being mounted between said legs, said slide being guided between said legs, teeth formed on the outer portion of said legs, and a drive pinion rotatable in said frame engaging said teeth and having a relieved central portion between said legs.

7. In a center drive chuck; a support frame, a chuck body rotatable in said frame and having a central opening to receive a workpiece, anvil means in the body to engage the workpiece on one side, a two arm jaw member pivoted in the chuck body having a wedge element on the end of the one arm to engage the workpiece on the side opposite said anvil means to clamp the workpiece in said chuck, the other arm on the jaw member extending to the region of the periphery of the chuck body, a slide member reciprocable on the chuck body at the periphery thereof in a generally tangential direction and connected to said other arm, a threaded shank on the slide, a nut on the chuck body receiving said shank, gearing drivingly connected to said nut including a first pinion adjacent the periphery of the chuck body at the side thereon on an axis parallel to the axis of rotation of the chuck body, a ring gear coaxial with the chuck body rotatably carried by said support frame and meshing with said first pinion, a second pinion rotatably carried by said support frame and also meshing with said ring gear, a reversible motor, clutch means for selectively engaging said motor with said second pinion to actuate said clutch jaw or for disengaging said motor from said second pinion to permit the second pinion to rotate freely during rotation of the chuck body, said chuck body having its peripheral portion formed of two axially spaced legs, said other arm extending between said legs, said nut being mounted between said legs, said slide being guided between said legs, teeth formed on the outer portion of said legs, a drive pinion rotatable in said frame engaging said teeth and having a relieved central portion between said legs, said nut being tubular, a block fixed between the legs of the chuck, and bearings rotatably supporting said nut in said block.

8. In a center drive chuck; a support frame, a chuck body rotatable in said frame and having a central opening to receive a workpiece, anvil means in the body to engage the workpiece on one side, a two arm jaw member pivoted in the chuck body having a wedge element on the end of the one arm to engage the workpiece on the side opposite said anvil means to clamp the workpiece in said chuck, the other arm on the jaw member extending to the region of the periphery of the chuck body, a slide member reciprocable on the chuck body at the periphery thereof in a generally tangential direction and connected to said other arm, a threaded shank on the slide, a nut on the chuck body receiving said shank, gearing drivingly connected to said nut including a first pinion adjacent the periphery of the chuck body at the side thereon on an axis parallel to the axis of rotation of the chuck body, a ring gear coaxial with the chuck body rotatably carried by said support frame and meshing with said first pinion, a second pinion rotatably carried by said support frame and also meshing with said ring gear, a reversible motor, clutch means for selectively engaging said motor with said second pinion to actuate said clutch jaw or for disengaging said motor from said second pinion to permit the second pinion to rotate freely during rotation of the chuck body, said chuck body having its peripheral portion formed of two axially spaced legs, said other arm extending between said legs, said nut being mounted between said legs, said slide being guided between said legs, teeth formed on the outer portion of said legs, a drive pinion rotatable in said frame engaging said teeth and having a relieved central portion between said legs, said nut being tubular, a block fixed between the legs of the chuck, and bearings rotatably supporting said nut in said block, a first bevel gear on one end of the nut, and a second bevel gear meshing with said first bevel gear and fixed to said first pinion to be driven thereby.

References Cited by the Examiner
UNITED STATES PATENTS
2,670,646   3/1954   Kendall et al. _____ 82—40

WILLIAM W. DYER, JR., *Primary Examiner.*